(12) United States Patent
Hart et al.

(10) Patent No.: US 12,371,276 B2
(45) Date of Patent: Jul. 29, 2025

(54) ASSEMBLY AND METHOD FOR SUPPLYING PRODUCT BASED ON WEIGHT

(71) Applicant: General Mills, Inc., Minneapolis, MN (US)

(72) Inventors: Kyle Thomas Hart, Marion, IA (US); Alexis Hugunin, Marion, IA (US); David S. Lutz, Andover, MN (US)

(73) Assignee: General Mills, Inc., Minneapolis, MN (US)

( * ) Notice: Subject to any disclaimer, the term of this patent is extended or adjusted under 35 U.S.C. 154(b) by 339 days.

(21) Appl. No.: 18/141,518

(22) Filed: May 1, 2023

(65) Prior Publication Data

US 2024/0367915 A1    Nov. 7, 2024

(51) Int. Cl.
*B65G 47/19* (2006.01)
*B65G 65/36* (2006.01)
*G01G 19/393* (2006.01)

(52) U.S. Cl.
CPC ............ *B65G 47/19* (2013.01); *B65G 65/36* (2013.01); *G01G 19/393* (2013.01)

(58) Field of Classification Search
CPC ....... G01G 19/393; B65G 47/19; B65G 65/03
See application file for complete search history.

(56) References Cited

U.S. PATENT DOCUMENTS

| | | | |
|---|---|---|---|
| 3,735,915 A | 5/1973 | Fuss | |
| 4,561,510 A | 12/1985 | Sugioka et al. | |
| 4,662,462 A | 5/1987 | Kitagawa et al. | |
| 4,825,896 A | 5/1989 | Mikata | |
| 5,603,458 A | 2/1997 | Sandolo | |
| 5,753,866 A * | 5/1998 | Ikeda | G01G 19/393 |
| | | | 209/939 |
| 5,780,779 A | 7/1998 | Kitamura et al. | |
| 6,493,605 B1 * | 12/2002 | Prideaux | G01G 19/393 |
| | | | 177/180 |
| 6,607,098 B2 | 8/2003 | Yamamoto | |
| 6,622,894 B2 | 9/2003 | Matsunaga et al. | |
| 2015/0021103 A1 * | 1/2015 | Tamai | G01G 19/387 |
| | | | 177/25.18 |

(Continued)

FOREIGN PATENT DOCUMENTS

| CN | 211733193 | 10/2020 | |
|---|---|---|---|
| CN | 114414012 A * | 4/2022 | |

(Continued)

*Primary Examiner* — Natalie Huls
(74) *Attorney, Agent, or Firm* — Jordan IP Law, LLC; John L. Crimmins, Esq.

(57) ABSTRACT

A weighing assembly supplies a predetermined amount of food product based on weight using a weighing machine having a plurality of weigh hoppers. A circular dispersion table having a dome shape distributes pieces of the product across the table by gravity to the weigh hoppers. A diverter chute is located above the dispersion table and includes multiple gates, with each gate configured to change a flow of the pieces of product over a portion of the dispersion table. The diverter chute further comprises an actuator for each gate for opening the gate as directed by a controller. Each actuator includes a piston and a lever arm connected to the piston and connected to a respective gate. An input conveyor drops pieces of food through the diversion chute to the dispersion table.

18 Claims, 2 Drawing Sheets

(56) References Cited

U.S. PATENT DOCUMENTS

2015/0316407 A1    11/2015  Clark et al.
2016/0209263 A1*    7/2016  Otoshi ................. G01G 19/393
2018/0038729 A1*    2/2018  Moriwaki .............. G01G 13/24

FOREIGN PATENT DOCUMENTS

| | | |
|---|---|---|
| FR | 1091842 | 4/1955 |
| GB | 311310 | 11/1928 |
| GB | 506754 | 10/1938 |
| JP | 2649073 B2 * | 9/1997 |
| JP | 2008196978 A * | 8/2008 |
| JP | 2010197127 | 9/2010 |

* cited by examiner

ASSEMBLY AND METHOD FOR SUPPLYING PRODUCT BASED ON WEIGHT

FIELD OF THE INVENTION

The invention generally pertains to supplying products to devices that weigh the products before packaging.

BACKGROUND OF THE INVENTION

Many products are sold by weight. For example, food products are typically provided for sale in various types of containers which are often either flexible or only partially filled. Even though the level of food in or shape of the container may change, preferably the weight of food per container is held constant. Typically, to achieve this goal of weight uniformity, food products are weighed during the food packaging process. More specifically, after pieces of food products are produced in a conventional manner, the food products are separated into portions of approximately equal weight and then the portions are conveyed to a weigh station including several hoppers. Each hopper is typically equipped with a load cell to determine the weight of food in the hopper. The hoppers allow a certain weight of food to collect and be sent to a packaging machine such as a cartoner which fills containers so that each container has approximately the same weight of food.

Separating the food into portions of approximately equal weight can be accomplish in different ways. One solution is to dispense the product on a smooth dome shaped circular table also known as a combination weigher/dispersion table. The product then travels radially outward due to gravity and the shape of the table. The weighing hoppers are located under an outer circumferential surface of the table so that, as food travels outwardly, the food enters the weighing hoppers. More specifically, the food enters short chutes directing the food from the edge of the table to each hopper. The hoppers have a load cell or other device that measures weight. The food eventually fills the hoppers to a predetermined amount of food based on a desired weight. The predetermined amount of food is then dumped out of the hopper and sent to a packaging machine, also known as a cartoner. With some types of foods, such as those in particulate form, the hoppers remain full, and the food is processed in an efficient manner. The rate at which the container is filled depends on the amount of food delivered from the dispersion table to the hoppers. So long as the dispersion table provides a constant flow of food, the overall process is efficient and effective.

In order to perform the weighing operation at a high speed, the hoppers are used in combination. Since the weight of the food in each hopper is known as the food fills the hoppers, the system can determine if a combination of hoppers includes the desired weight of food, and the food is dispensed or dumped from multiple hoppers so that the desired amount: of food is sent to the packaging machine from multiple hoppers. Such a process is known as combination weighing. Additional details regarding combination weighing can be found in U.S. Pat. No. 6,607,098 and U.S. Patent Application No. 2015/031407, both of which are incorporated herein by reference. In this manner a predetermined amount of food can be obtained. Typically, the packaging machine will request the predetermined amount of food when ready to accept more food and the weighing machine will dispense the predetermined amount of food when receiving the request.

Some food products, such as wrapped food products, drop unevenly onto the weigher dispersion table. For example, some food products drop unevenly due to the weight/geometry characteristics of the wrapped product. Specifically, wrapped fruit by the foot products cannot be evenly distributed across the combination weigher dispersion table due to the weight/geometry characteristics of the wrapped product. Product that is unevenly distributed creates losses, because some hoppers simply do not receive any product or less product than the hopper can handle. The overall process slows down from lower weighted or empty hoppers. Without full distribution and utilization of the scale weigh hoppers, the hoppers will not have a combination equal to the desired amount of food to fulfill the weight/dump request from the packaging machine. This results in a lower packaging machine utilization because a finished packaged carton of food product will not be produced until the weighing machine has a combination of hoppers available to dispense the predetermined amount of food.

Based on the above, there exists a need in the art for a mechanism that causes a weigher dispersion table to consistently supply food product to scale weigh hoppers located around the dispersion table.

SUMMARY OF THE INVENTION

A weighing assembly is configured to supply a predetermined amount of food product based on weight. The assembly includes a weighing machine having a plurality of weighing hoppers. A circular dispersion table, preferably having a dome shape, distributes pieces of the product across the table by gravity to the weighing hoppers. A diverter chute is located above the dispersion table and includes multiple gates, with each gate configured to change a flow of the pieces of product over a portion of the dispersion table. The diverter chute further comprises an actuator for each gate for opening the gate as directed by the controller. Each actuator includes a piston and a lever arm connected between the piston and a respective gate. An infeed conveyor drops pieces of food through the diversion chute to the dispersion table.

A sensor assembly is provided and configured to monitor the positions of the pieces of product on the dispersion table. The sensor assembly includes a photosensor associated with each gate. Preferably the diverter chute has four gates that are independently controlled based on an amount of food detected by the photosensor. The diverter chute preferably includes gates which are opened and closed to divert product so that the product distributes evenly over the dispersion table. Each gate is controlled through a controller which receives signals from the photosensor for detecting low product and, correspondingly, controls the opening of an appropriate gate. Therefore, the controller opens one or more of the gates based on the positions of the pieces of product to change the flow of pieces of product and the hoppers are configured to operate in combination to provide a predetermined or specified amount of food to a packaging machine.

The method of suppling a predetermined amount of product based on weight with a weighing machine having a plurality of weighing hoppers in accordance with the invention includes: passing pieces of product through a diverter chute to a dispersion table; distributing the pieces of product in a flow across the dispersion table into the weigh hoppers; changing the flow of the pieces of product across the dispersion table with the diverter chute; monitoring the positions of the pieces of product on the dispersion table;

and controlling the opening of one or more gates of the diverter chute based on the positions of the pieces of product.

Preferably, the sensing of the positions of the pieces of product on the dispersion table is conducted with a photosensor. The food product is weighed in the hoppers and the hoppers are operated synergistically to provide the predetermined amount of food to a packaging machine.

The product diverter chute is mounted directly over the scale dispersion table and preferably contains four product gates. Each gate utilizes a photo eye sensor to monitor the product level within the sensor range. When a low amount of product is detected near a particular gate, the divert gate will open to allow product to flow to the area. The result is full utilization of the scale weigh hoppers.

With this arrangement, product is effectively diverted to one or more areas of the combination weigher dispersion table that has the least amount of available product, enabling the table to be employed to consistently supply food product to the scale weighing hoppers located around the table. With the scale hoppers full, any demand by the packaging machine will be immediately fulfilled and therefore production will be increased.

Figure 1:
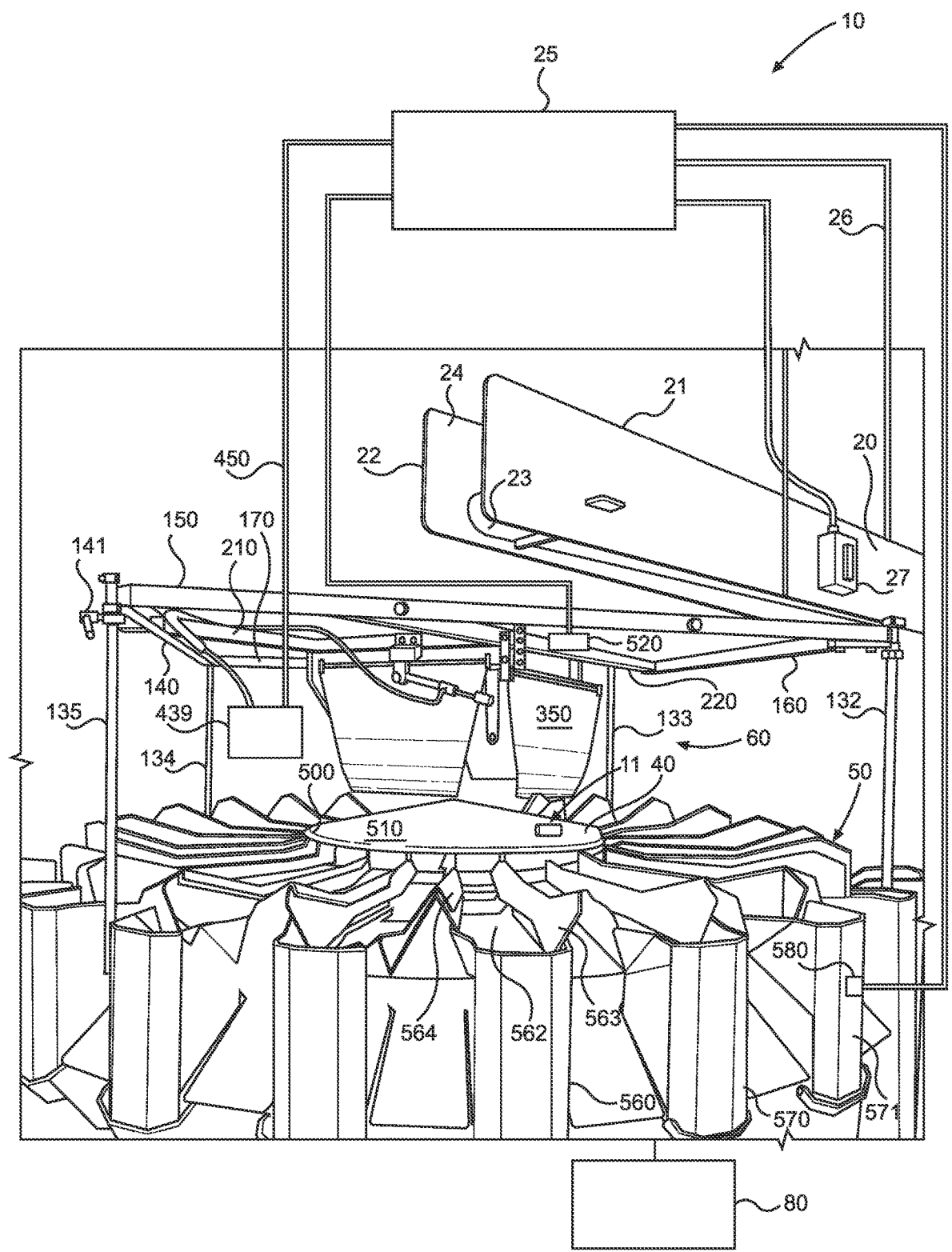
FIG. 1 is a perspective view of a weighing assembly including a dispersion table, a diverter chute and weighing hoppers.

Additional objects, features and advantages of the invention will become more readily apparent from the following detailed description of preferred embodiments thereof when taken in conjunction with the drawings wherein like reference numerals refer to common parts in the several views. Therefore, the detailed description and the drawings, which are not necessarily to scale, set forth illustrative and exemplary embodiments and are not intended to limit the scope of the disclosure.

DETAILED DESCRIPTION OF EMBODIMENTS

Initially it should be noted that elected features of any illustrative embodiment can be incorporated into an additional embodiment unless clearly stated to the contrary. While the disclosure is amenable to various modifications and alternative forms, specifics thereof have been shown by way of example in the drawings and will be described in detail. As used in the specification and claims, including as used in the examples and unless otherwise expressly specified, all numbers may be read as if prefaced by the word "about" or "approximately," even if the term does not expressly appear, with it being understood that this provides a reasonable expected range of values in the order of +/−10% of the stated value (or range of values). In addition, any numerical range recited herein is intended to include all sub-ranges subsumed therein. Overall, it should be understood, however, that the intention is not to limit aspects of the disclosure to the particular illustrative embodiments described. On the contrary, the intention is to cover all modifications, equivalents, and alternatives falling within the spirit and scope of the disclosure.

Turning to FIG. 1, there is shown an overall layout of an exemplary embodiment of the invention. More specifically a combination weighing assembly 10 for processing pieces of product, such as wrapped food products 11, is shown. The combination weighing assembly 10 receives manufactured food products 11 and prepares the food products 11 for packaging.

More particularly, the combination weighing assembly 10 includes an infeed conveyor 20 for supplying the manufactured food products 11. The infeed conveyor 20 is formed with a first sidewall 21 and a second sidewall 22. The sidewalls 21, 22 are preferably made of smooth metal so that the sidewalls 21, 22 are easy to clean and maintain a sanitary environment for food products 11. The infeed conveyer 20 is also provided with a belt mechanism 23 situated between the first sidewall 21 and the second sidewall 22. The belt mechanism 23 is made of a continuous flexible belt mounted on two pulleys (not shown). The flexible belt has a top surface configured to move food products 11 between the two side walls 21, 22 to an exit 24 of the infeed conveyor 20. A controller 25 is arranged to send control signals to the infeed conveyor 20, preferably through a control wire 26. The controller 25 is also configured to provide alert signals to a light 27.

As clearly seen in FIG. 1, infeed conveyor 20 is located above a dispersion table 40 in the center of a hopper assembly 50. A product diverter chute 60 is located between infeed conveyor 20 and dispersion table 40. The hopper assembly 50 is arranged to send the food products in groups of equal weight to various packaging machines, referenced at 80, as will be detailed below.

With continued reference to FIG. 1, the product diverter chute 60 is formed with a mounting frame assembly having four upright posts 132-135, which are preferably made of metal. As depicted, posts 132-135 are in the shape of rods, but could also be made of other shapes, as well as other materials. Preferably the posts 132-135 have a diameter in the order of ⅝ inches but could be sized as needed to provide support. The upright posts 132-135 are connected by main beams, one of which is labelled 140, with beams 140 being connected to upright posts 132-135 by brackets, one of which is indicated at 141. The main beam 140 is also preferably made of metal.

Figure 2:
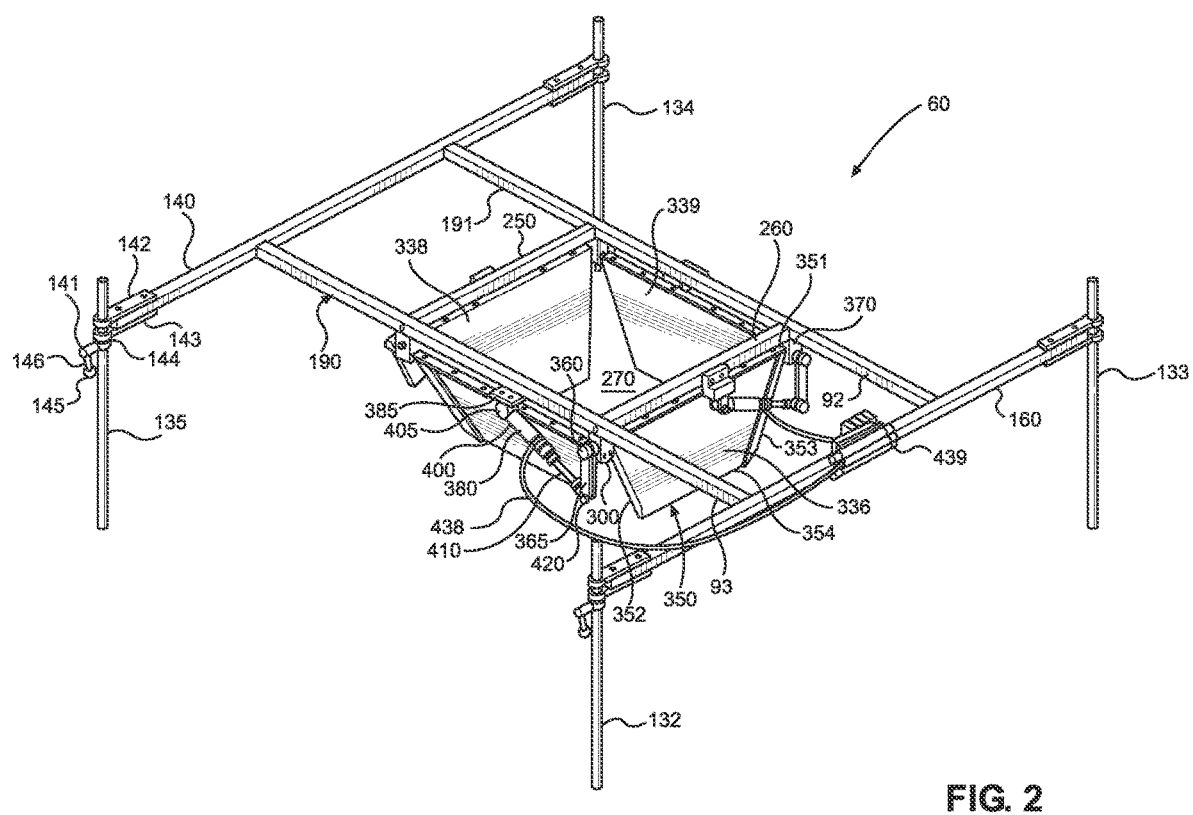
FIG. 2 is an upper perspective view of the diverter chute from FIG. 1.

As best seen in FIG. 2, bracket 141 is formed as a weldment mounted on the main beam 140 and includes an upper plate 142 and a lower plate 143. Each plate 142, 143 is formed with a hole 144 through which extends a respective upright post 132-135. A clamping mechanism 145 is located under lower plate 142 and has an associated lever arm 146 for actuating the clamping mechanism 145. Main beam 140 has an associated clamping mechanism 145, not separately labelled. The main beam 140 is raised or lowered to a desired height and then the clamping mechanism 145 is employed to lock the main beam 140 at the desired height.

In the embodiment shown, four main beams 140, 150, 160 and 170 are provided in a square configuration, with the main beams 140, 150, 160, 170 meeting at upright posts 132-135, respectively, as shown in FIG. 1. Alternatively, two main beams 140, 160 are arranged between the upright posts 132-135, as shown in FIG. 2. Again, while a square cross-section is shown, a wide range of geometric shapes could be employed. In both embodiments, a pair of long beams extend between the main beams. More specifically, as shown in FIG. 2, long beams 190 and 191 extend at right angles to main beams 140 and 160 while, as shown in FIG. 1, long beams 210 and 220 are arranged at other angles relative to main beams 140, 150, 160, 170. Since the arrangement in FIG. 1 has four main beams, one of the long beams 120 can be arranged to span between two adjacent main beams 150, 160. This arrangement allows the product diverter chute 60 to be place at a desired orientation relative to infeed conveyor 20.

The long beams 190 and 191 are preferably parallel to each other, as shown in FIG. 2. A first cross beam 250 and a second cross beam 260 extend between long beams 190 and 191 to form a square-shaped opening 270 configured to allow the passage of food products 11. The first cross beam 250 is attached to long beams 190 and 191 at first and second ends. A housing subassembly 300 is attached to long beam 190 where long beam 190 meets cross beam 260. As such, four housing subassemblies, not separately labelled, extend downward from long beams 190 and 191. Four gate assemblies or panels 336, 338, 339 and 380 are mounted on the four housing subassemblies.

Since the multiple (preferably four) gates are similar, one gate 350 will be described in detail with reference to FIG. 2. Gate 350 includes a panel 336, formed in a trapezoidal shape having four edges and a relatively flat inner side. An outer side is provided with reinforcing flanges 351-353 on an upper edge and on two side edges. The bottom edge 354 preferably has no flange. The top reinforcing flange 351 extends the entire length of the top edge. Preferably panel 336 is made of metal, but other materials could be used based on design parameters, including moment of inertia considerations. For example, preferably the moment of inertia of panel 336 should be about 26.6 lb/in$^2$ or less, while maintaining enough strength to support panel 336 and the food items impacting panel 336.

The top reinforcing flange 351 and the left side reinforcing flange 352 meet at a top left corner. A pin 360 extends from the top left corner of panel 336, through housing subassembly 300, whereat pin 360 is connected to a lever arm 365. Top reinforcing flange 351 and right side reinforcing flange 353 meet at the top right corner of panel 336 where a pin, not separately shown, extends into the housing subassembly 370 and is mounted so as to allow panel 336 to be supported by housing subassembly 370 while also being able to pivot relative to housing subassembly 370.

Lever arm 365 extends from pin 360 and is connected to an actuator 380. The lever arm 365 is preferably made of a strong light weight material with a low moment of inertia of about 2.91 lb/in$^2$ or less. Preferably, actuator 380 is connected to a cylinder mounting 385 fastened to a middle portion of long beam 190. More specifically, cylinder mounting 385 is secured to long beam 190 with fasteners but could also be attached by other fastening systems, such as by welding or an adhesive. Other cylinder mountings are secured to the cross beams and/or long beams.

A cylinder 400 is connected to cylinder mounting 385 with a pivotable connection. The cylinder 400 contains a slidable piston 410, with slidable piston 410 being attached in a pivotable manner to lever arm 365. Slidable piston 410 can moved by a fluid pressure developed on a first side of slidable piston 410, causing slidable piston 410 to extend and move lever arm 365. This motion also causes panel 336 to pivot away from square shaped opening 270 to enlarge the area receiving food product 11. Piston 410 can also be moved by pressure on a second side of piston 410, causing piston 410 to retract. This motion causes panel 336 to pivot toward square shaped opening 270 to reduce the area of square shaped opening 270 receiving food product 11.

The requisite fluid is provided to cylinder 400 by a communication line 438 that extends to a set of valves 439. Valves 439 are preferably mounted on the main beams. Valves 439 are connected to controller 25 by communication lines 450 and controller 25 directs valves 439 to send pressurized fluid to actuator 380 depending on the desired position of panel 336. The low moment of inertia of arm 365 and panel 336 allows for actuator 380 to move arm 365 and panel 336 quickly. Each of the gates is constructed in a similar manner to gate 350. In a particularly preferred embodiment, the actuators are designed to enable panels 336, 338, 339 and 380 to quickly shift from a retracted, start position to an extended position within approximately 0.35 seconds and contract the panels within approximately 0.5 seconds. While the panels 336, 338, 339 and 380 can move in concert with each other, each panel 336, 338, 339 and 380 has its own associated actuator, enabling panels 336, 338, 339 and 380 to be advantageously shifted independently from each other.

As noted above, a dispersion table 40 is located below diverting chute 60. The dispersion table 40 has a circular outer edge 500 and an upper surface 510 with a raised center forming a dome shape. The dome shape advantageously allows products 11 to slide outwardly from the center of the dome to the circular outer edge 500 of the dispersion table 40. A one or more photosensor or optical sensors 520 is/are arranged to view dispersion table 40 to determine how many food products 11 are located on dispersion table 40. For example, optical sensor 520 is arranged to detect how many food products 11 are located under panel 336 on dispersion table 40. The optical sensors are connected to controller 25 to signal controller 25 information on the location and amount of food products 11 on dispersion table 40.

Arranged below circular edge 500 of dispersion table 40 is a circular array of hoppers forming hopper assembly 50. A hopper 560 is shown with a short collection slide 562 formed with side walls 563 and 564. Other hoppers, such as hoppers 570 and 571, are located next to each other and also have slides (not separately labeled) so as to leave no gaps between the hoppers. Any products 11 exiting at circular edge 500 of dispersion table 40 will fall onto one of the slides, such as collection slide 562, and be directed to one of the hoppers, such as hopper 560. Each hopper, such as hopper 571, is equipped with a load cell 580 or other sensor for measuring the weight of the food product 11, as the food product 11 is collected in each hopper 571. When a hopper 571, or a combination of hoppers 560, 570, 571, fills to a combined weight that represents a desired predetermined amount of food, the hopper 571, or a combination of hoppers 560, 570 and 571, is emptied upon request of the packaging machine 80, and the predetermined amount of food is sent to packaging machine 80.

Controller 25, as noted above, is connected to optical sensor 520 and actuator 380. Preferably controller 25 is also connected to load cell 580 of each hopper. Controller 25 may be any computer system with a memory, a processor and an input device, such as a keyboard or mouse, and is programed to receive information from optical sensors 520 as to where food products 11 are being dispensed on dispersion table 40. Controller 25 also controls actuator 380 and, in turn, the amount panel 336 moves in product diverter chute 60.

During normal operation, belt mechanism 23 moves food products 11 to exit end 24 of infeed conveyor 20 where products 11 drop onto dispersion table 40. Controller 25 monitors the distribution of food products 11 on dispersion table 40. As some portions of dispersion table 40 collect more food products 11 than other portions of dispersion table 40, hoppers 560, 570, 571 collect food products 11 at different rates. Controller 25 sends signals to the actuators, such as actuator 380 of product diverter chute 60, to even out the distribution of food products 11 and avoid having some hoppers 560, 570, 571 empty. The packaging machine 80 will send a signal to request a desired amount of food by weight. If any combination of one or more of the hoppers 560, 570, 571 contain the desired amount of weight of food, those hoppers 560, 570, 571 will be caused to send the desired amount of food to packaging machine 80. If any combination of one or more hoppers 560, 570, 571 do not have the desired amount of weight, there will be a delay until hoppers 560, 570, 571 fill to the point at which one or more of the hoppers 560, 570, 571 do fill to the desired amount. By controlling food products 11 with diversion chute 60, the overall process becomes quite efficient and products 11 move at a faster rate.

As should be evident from the above discussion, the preferred embodiments disclose a system that quickly and efficiently provides desired amounts of food, by weight, to a packaging machine without the delays caused by hoppers that do not fill quickly or remain empty. Although various illustrative embodiments are described above, changes may be made to the various disclosed embodiments without departing from the scope of the invention as encompassed by the claims. For example, the optical sensors could be mounted to view the amount of product entering each hopper and the controller could open the panels of the diversion chute based on the amount of product in each hopper. The controller could also simply use signals from the load sensor(s) in the hopper in determining the positions of food product in each hopper to achieve this goal and thus eliminate the optical sensors. Overall, the invention has broad applicability in packaging various products that do not flow well.

The invention claimed is:

1. A weighing assembly for supplying a predetermined amount of product based on weight comprising:
    a weighing machine having a plurality of weigh hoppers;
    a dispersion table for distributing pieces of product from across the table to the weigh hoppers;
    a diverter chute located above the dispersion table and including multiple gates, with each gate configured to change a flow of the pieces of product over a portion of the dispersion table;
    a sensor assembly configured to monitor positions of the pieces of product on the dispersion table; and
    a controller for opening one or more of the gates, based on the positions of the pieces of product, to change the flow of pieces of product.

2. The weighing assembly according to claim 1, wherein the diverter chute further comprises an actuator for adjusting an opening of a respective said gate as directed by the controller.

3. The weighing assembly according to claim 2, wherein the sensor assembly includes a photosensor associated with each respective said gate.

4. The weighing assembly according to claim 3, wherein the diverter chute has four gates that are independently controlled based on an amount of food detected by each photosensor.

5. The weighing assembly according to claim 4, wherein each actuator includes a piston and a lever arm having a first end connected to the piston and a second end connected to the respective gate.

6. The weighing assembly according to claim 5, wherein the pieces of product are pieces of wrapped food product, and the weighing assembly is configured to weigh the wrapped food product.

7. The weighing assembly according to claim 5, wherein the dispersion table has a top surface with a dome shape.

8. The weighing assembly according to claim 7, wherein the dispersion table is dome shaped and circular.

9. The weighing assembly according to claim 1, wherein the hoppers are configured to operate in combination to provide the predetermined amount of food to a packaging machine.

10. The weighing assembly according to claim 1, further comprising an input conveyor for dropping pieces of food through the diverter chute to the dispersion table.

11. A method of suppling a predetermined amount of product, based on weight, with a weighing machine having a plurality of weigh hoppers, said method comprising:
    passing the product through a diverter chute having gates to a dispersion table;
    distributing pieces of product in a flow across the dispersion table into the weigh hoppers;
    changing the flow of the pieces of product across the dispersion table with the diverter chute;
    monitoring positions of the pieces of product on the dispersion table; and
    controlling the gates of the diverter chute based on the positions of the pieces of product, with a controller.

12. The method according to claim 11, further comprising:
    opening each gate with a respective actuator as directed by the controller.

13. The method according to claim 12, further comprising monitoring the positions of the pieces of product on the dispersion table is conducted with a photosensor.

14. The method according to claim 13, wherein the diverter chute has four gates, said method further comprising opening one or more of the four gates based on the amount of food sensed by the photosensor and the predetermined amount of product.

15. The method according to claim 14, further comprising weighing a food product in the hoppers.

16. The method according to claim 15, further comprising operating the hoppers in combination to provide the predetermined amount of food to a packaging machine.

17. The method according to claim 16, further comprising supplying food pieces to the dispersion table with a conveyor.

18. The method according to claim 17, wherein supplying food pieces includes dropping the food pieces from the conveyor through the diverter chute to the dispersion table.

* * * * *